United States Patent Office 3,657,166
Patented Apr. 18, 1972

3,657,166
PRODUCTION OF FOAMED THERMOPLASTIC
WITH CARBONIZED CELLULAR STRUCTURE
William A. Caldwell, Olathe, Kans., assignor to
Phillips Petroleum Company
No Drawing. Filed Oct. 8, 1969, Ser. No. 864,878
Int. Cl. C08f 29/04, 47/10
U.S. Cl. 260—2.5 HA
5 Claims

ABSTRACT OF THE DISCLOSURE

A foamed thermoplastic material with carbonized cellular structure is formed either by mixing a foamable thermoplastic resinous material and a polybasic organic acid and an ammonium salt, or by mixing a foamable thermoplastic resinous material and an ammonium salt of a polybasic organic acid and elevating the temperature to the carbonizing temperature of the organic acid. In a specific embodiment, a mixture of polyethylene and ammonium citrate is raised to the decomposition temperature of the ammonium citrate to produce a foamed polyethylene with fine cellular structure which is colored by the elemental carbon produced in the decomposition reaction.

BACKGROUND OF THE INVENTION

This invention relates to the production of foamed thermoplastic material. In one aspect, it relates to imparting a decorative coloration to the thermoplastic material. In another aspect, it relates to imparting a fine cellular structure to the thermoplastic material. In still another aspect, it relates to a method for introducing dispersed elemental carbon into the thermoplastic material. In another aspect, it relates to a method for utilizing a productive class of gas evolving compounds as blowing agents. In still another aspect, it relates to nucleating a foaming reaction.

Foaming of thermoplastic materials is well known to the art. The addition of carbon black for nucleation and color production is also well known. Prior to my invention, however, it has not been known to use blowing agents which can be decomposed to produce gas for blowing and elemental carbon for nucleating the reaction and coloring the foamed thermoplastic at the same time. This invention produces a colored, foamed thermoplastic which has a surprisingly uniformly fine cellular structure.

It is therefore an object of my invention to utilize a previously unused productive class of gas evolving compounds as blowing agents for foamed thermoplastic materials. It is a still further object of my invention to produce a colored, foamed thermoplastic material of more uniformly fine celled structure.

Other aspects, objects, and the several advantages of this invention will be apparent to one skilled in the art from a study of this disclosure.

SUMMARY OF THE INVENTION

According to the invention, a finely celled foamed thermoplastic resinous material which is colored by dispersed elemental carbon is produced by raising the temperature of a mixture of a resinous material and a foaming agent sufficiently to decompose the foaming agents to a blowing gas and elemental carbon. The elemental carbon produced when the blowing agent is held at its carbonizing temperature acts as a nucleating agent for the foaming caused by the gases evolved from the decomposition of the foaming agent and also imparts color to the foamed resin. The nucleation of the foaming produces a uniform finely celled structure in the foamed resin.

DESCRIPTION OF THE PREFERRED EMBODIMENTS

According to one embodiment of my invention an ammonium salt of certain polybasic organic acids and polybasic hydroxy organic acids can be decomposed to produce the blowing gases and elemental carbon. Additionally, in another embodiment of my invention, a mixture of ammonium carbonate or ammonium bicarbonate added with certain polybasic organic acids or polybasic hydroxy organic acids can be employed as the blowing agent.

The polybasic organic acids and polybasic hydroxy organic acids and ammonium salts of these acids suitable for this invention can be expressed by the formula:

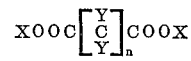

wherein for the acids, X must be H; or for the ammonium salts, X may be H or NH+, but at least one X must be NH$_4$+; $n$ is 1 to 6; and Y is H, OH, or COOH, but there can be no more than two COOH or three OH substitutions in the Y designation of any molecule.

Among the ammonium salts appropriate for this reaction are:

diammonium malonate
    diammonium succinate
    diammonium citrate
    ammonium tartrate
    diammonium adipate
    ammonium pimelate
    diammonium suberate
    ammonium malate, and the like.

Among the polybasic organic acids and polybasic hydroxy organic acids appropriate for this reaction are:

malonic acid
    succinic acid
    citric acid
    tartaric acid
    adipic acid
    pimelic acid
    suberic acid
    malic acid, and the like.

All of the usual foamable thermoplastic resinous materials which will withstand a temperature sufficient to carbonize the acids employed are suitable for use in this invention. Among those preferred are polymers of ethylene, polymers of propylene, and polyamides.

Conditions under which the decomposition takes place will be varied depending upon the actual materials used, and the degree of carbonization desired. Temperature generally will be within the range of 325–550° F. preferably within 375–500° F. but the temperature must be sufficient to carbonize the particular acid or ammonium salt of the acid used in the reaction. Time of reaction will be within the range of about 1 to 8 minutes, preferably 2 to 5 minutes, the period for which a resin is usually held within standard molding equipment.

Concentration of the foaming agent can vary from 0.25 to 2.0 weight percent based on the weight of the foamable resin. Preferred embodiments of the invention use 0.5 weight percent of the ammonium salt of the organic acid or 0.25 weight percent of each of the free organic acid and ammonium carbonate or ammonium bicarbonate. The total amount of blowing agent necessary would be the same whether consisting of the ammonium salt or a mixture of the free acid and ammonium carbonate or ammonium bicarbonate. Concentration will vary depending upon the amount of carbon desired to be available for carbonization.

The thermoplastic resinous material which is to be foamed is well mixed with the foaming agent in a dry blending operation. This mixture is then processed through standard molding equipment where the temperature is raised to a level and held for a time sufficient to decompose the blowing agent. The foamed resinous material produced is useful in a variety of configurations such as foamed sheets, tubes of various shapes, or molded articles.

The foamed thermoplastics produced by this operation are found to have uniformly, unusually fine cellular structuer which is caused by the nucleation of the foaming by the elemental carbon produced in the carbonization reaction. The carbon is evenly dispersed in the foamed materials imparting color to the structure. The degree of free carbon formation can be controlled and thereby the degree of color imparted can be controlled by addition of inorganic oxidizing agents such as $KClO_3$ or $NH_4NO_3$. The proportion of the blowing agent-oxidizer ratio may be varied to give from no oxidation of the carbon to complete oxidation. The tinting of the foamed thermoplastic produced will vary accordingly.

Preferred embodiments of the invention are shown in the following examples which are not meant to limit the scope of the invention but are presented as illustrations.

EXAMPLE I 0.5 weight percent ammonium citrate, based on the resin, was dry blended with polyethylene resin. The polyethylene used in these Examples (I–III) had a density of 0.955 and a melt index of 18 (ASTM D 1238–65T). The mixture was processed through standard injection molding equipment. The temperature was raised to 425° F. and the material was retained in the screw of the injection molding equipment for 2 to 5 minutes. A molded article of finely celled, foamed material of patterned grey to jet black pigmentation was produced.

EXAMPLE II 0.25 weight percent ammonium carbonate and 0.25 weight percent citric acid, based on the resin, was dry blended with the polyethylene resin of Example I. The mixture was processed through standard injection molding equipment. The temperature was raised to 425° F. and the mixture was retained in the screw of the injection molding equipment for about 2 to 5 minutes. A molded article of finely celled, foamed material of patterned grey to jet black pigmentation like that of Example I was produced.

EXAMPLE III 0.5 weight percent of citric acid based on the resin was dry blended with the polyethylene resin of Example I. The mixture was processed through standard injection molding equipment. There was no foaming or development of color, even though the temperature was raised to 425° F. which is well above the theoretical decomposition temperature of citric acid which is 307° F. This is an indication that the $NH_4^+$ radical is necessary as an ingredient in the decomposition reaction.

EXAMPLE IV 0.5 weight percent ammonium tartrate based on the resin, was dry blended with a crystalline polypropylene resin. The polypropylene used in this example was a crystalline polymer with a density of 0.905 and melt flow of 5 (ASTM D 1238–67T; 230° C., 2160 g.). The mixture was processed through standard injection molding equipment. The temperature was raised to 500° F. and the mixture retained in the screw of the injection molding equipment for 2 to 5 minutes. A molded article of finely celled, foamed material of patterned brown pigmentation was produced.

The calculated yield of gaseous material in the decomposition of the most commonly used blowing agent, 1,1-azobisformamide and the gaseous yield from ammonium citrate are presented below for comparison. Ammonium citrate is presented as an illustration of a class of compounds that not only evolves a greater volume of gas than the commonly used blowing agents but also breaks down to form elemental carbon which nucleates a finely celled structure and colors the foamed thermoplastic material.

TABLE I

| Compound: | Gas yield cc./gm. decomposed |
| --- | --- |
| 1,1-azobisformamide | 225 |
| Ammonium citrate | 750 |

Reasonable variation and modification are permissible within the scope of the disclosure of my invention, the essence of which is that a foamable thermoplastic resinous material is foamed with a foaming agent which decomposes to form a blowing gas and elemental carbon.

I claim:

1. A method of producing a foamed thermoplastic material with carbonized cellular structure which comprises:
    (A) preparing an admixture consisting of
        (1) a foaming agent consisting of an ammonium salt of a polybasic organic acid or polybasic hydroxy organic acid of the formula

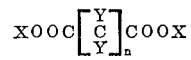

wherein X is H or $NH_4^+$ but at least one X must be $NH_4^+$; $n$ is 1 to 6; and Y is H, OH, or COOH, but there can be no more than two COOH or three OH substitutions in the Y designation of any molecule, with
        (2) a foamable thermoplastic material capable of withstanding the carbonization temperature of said organic acid compound, and
    (B) elevating the temperature of the mixture to the carbonization temperature of the organic acid compound and holding the temperature at this level for a period of time sufficient to decompose the foaming agent to produce the carbonized cellular structure in the plastic material.

2. The method of claim 1 wherein the concentration of the ammonium salt is from about 0.25 to about 2.0 weight percent based on the weight of the resin to be foamed.

3. The method of claim 1 wherein the temperature of the reaction is in the range of about 325 to about 500° F. and the reaction time is from about 1 to about 8 minutes.

4. The method of claim 1 wherein the thermoplastic resins are polypropylene or polyethylene and the ammonium salt is ammonium citrate or ammonium tartrate.

5. A foamed thermoplastic material with carbonized cellular structure formed by the process of claim 1.

References Cited

UNITED STATES PATENTS

| 3,151,192 | 9/1964 | Jacobs et al. | 260—25 E |

FOREIGN PATENTS

| 210,728 | 10/1957 | Australia | 260—2.5 E |
| 1,052,289 | 12/1966 | Great Britain | 260—2.5 E |

SAMUEL H. BLECH, Primary Examiner

W. J. BRIGGS, SR., Assistant Examiner

U.S. Cl. X.R.

260—2.5 R, 2.5 E, 94.9 GD, 536, 537; 264—54